United States Patent
Miller (10) Patent No.: US 9,311,513 B2
(45) Date of Patent: *Apr. 12, 2016

(54) METAL TOOTH DETECTION AND LOCATING

(71) Applicant: Harnischfeger Technologies, Inc., Wilmington, DE (US)

(72) Inventor: Lee Miller, Milwaukee, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/517,479

(22) Filed: Oct. 17, 2014

(65) Prior Publication Data

US 2015/0035673 A1 Feb. 5, 2015

Related U.S. Application Data

(63) Continuation of application No. 13/220,260, filed on Aug. 29, 2011, now Pat. No. 8,890,672.

(51) Int. Cl.
| | |
|---|---|
| *G08B 13/14* | (2006.01) |
| *G06K 7/10* | (2006.01) |
| *H04Q 9/00* | (2006.01) |
| *E02F 9/26* | (2006.01) |
| *E02F 9/28* | (2006.01) |

(52) U.S. Cl.
CPC ............ *G06K 7/10009* (2013.01); *E02F 9/26* (2013.01); *E02F 9/2808* (2013.01); *E02F 9/2816* (2013.01); *H04Q 9/00* (2013.01); *H04Q 2209/47* (2013.01)

(58) Field of Classification Search
None
See application file for complete search history.

(56) References Cited

U.S. PATENT DOCUMENTS

| | | |
|---|---|---|
| 5,627,749 A | 5/1997 | Waterman et al. |
| 5,743,031 A | 4/1998 | Launder et al. |
| 6,229,443 B1 | 5/2001 | Roesner |
| 6,374,990 B1 | 4/2002 | Swinderman |
| 6,415,916 B1 | 7/2002 | Rini |
| 6,469,638 B1 | 10/2002 | Johnson |
| 6,870,485 B2 | 3/2005 | Lujan et al. |
| 6,990,390 B2 | 1/2006 | Groth et al. |
| 7,199,718 B2 | 4/2007 | Kikuchi et al. |

(Continued)

FOREIGN PATENT DOCUMENTS

WO 2010096873 A1 9/2010

OTHER PUBLICATIONS

International Search Report and Written Opinion for Application No. PCT/US2012/052798 dated Nov. 16, 2012 (5 pages).

(Continued)

*Primary Examiner* — Curtis King
(74) *Attorney, Agent, or Firm* — Michael Best & Friedrich LLP (57) ABSTRACT

Methods and systems for tracking heavy machine teeth. One system includes a heavy machine tooth configured to be mounted on a bucket of a heavy machine, an active RFID tag coupled to the heavy machine tooth to move with the tooth, and an RFID reader configured to read data from the RFID tag, The RFID reader is further configured to provide an indication regarding the location of the tooth when the tooth separates from the bucket based on the data read from the RFID tag and provide diagnostic information regarding the heavy machine tooth based on the data read from the RFID tag.

17 Claims, 7 Drawing Sheets

(56) References Cited

U.S. PATENT DOCUMENTS

| | | | |
|---|---|---|---|
| 7,248,154 B2 | 7/2007 | Menke | |
| 7,257,504 B2* | 8/2007 | Bolander et al. | 702/106 |
| 7,406,399 B2 | 7/2008 | Furem et al. | |
| 7,408,456 B2 | 8/2008 | Whitesmith et al. | |
| 7,579,952 B2 | 8/2009 | Osterholt et al. | |
| 7,652,579 B2 | 1/2010 | Keyaki et al. | |
| 7,898,403 B2 | 3/2011 | Ritter et al. | |
| 8,004,397 B2 | 8/2011 | Forrest et al. | |
| 8,890,672 B2 | 11/2014 | Miller | |
| 2002/0005297 A1 | 1/2002 | Alft et al. | |
| 2004/0227645 A1 | 11/2004 | Lujan et al. | |
| 2005/0007239 A1 | 1/2005 | Woodard et al. | |
| 2005/0288937 A1* | 12/2005 | Verdiramo | 705/1 |
| 2006/0042734 A1 | 3/2006 | Turner et al. | |
| 2006/0226984 A1* | 10/2006 | Menke | 340/572.1 |
| 2007/0108296 A1 | 5/2007 | Konopka et al. | |
| 2007/0241908 A1* | 10/2007 | Coop | 340/572.8 |
| 2007/0290856 A1 | 12/2007 | Martin | |
| 2008/0231458 A1 | 9/2008 | Fein | |
| 2009/0289582 A1 | 11/2009 | Armitage et al. | |
| 2010/0045311 A1* | 2/2010 | Chung | 324/718 |
| 2010/0079288 A1 | 4/2010 | Collins et al. | |
| 2010/0142759 A1 | 6/2010 | Ridley et al. | |
| 2010/0164742 A1* | 7/2010 | Anderson | 340/825.52 |
| 2010/0238002 A1 | 9/2010 | Ryan et al. | |
| 2012/0098654 A1* | 4/2012 | Ebert | 340/438 |
| 2013/0271274 A1 | 10/2013 | Ebert | |

OTHER PUBLICATIONS

International Preliminary Report on Patentability for Application No. PCT/US2012/052798 dated Mar. 4, 2014 (5 pages).

Patent Examination Report from the Australian Patent Office for Application No. 2012302078 dated Nov. 21, 2014 (3 pages).

Second Examination Report from the Australian Patent Office for Application No. 2012302078 dated Mar. 20, 2015 (4 pages).

First Office Action from the State Intellectual Property Office of the People's Republic of China for Application No. 2012800426944 dated Jun. 1, 2015 (20 pages).

Examination Report from the Intellectual Property Office of Mexico for Application No. Mx/a/2014/002453 dated May 3, 2015 (4 pages).

* cited by examiner

METAL TOOTH DETECTION AND LOCATING

RELATED APPLICATIONS

This application is a continuation of U.S. application Ser. No. 13/220,260, filed Aug. 29, 2011, the entire content of which is hereby incorporated by reference.

BACKGROUND

The invention relates to detection and locating of heavy machine teeth, specifically the use of radio frequency identification (RFID) tags to determine when a metal tooth is no longer on a bucket of a heavy machine.

Heavy machines (e.g., mining equipment such as draglines and shovels) utilize steel teeth in their bucket designs. The teeth are used for several reasons: They provide a smaller point of surface area when digging into the earth, helping to break up the earth, and requiring less force than the larger surface area of a bucket itself In addition, the teeth provide easily replaceable wear points that save the bucket itself from wearing down. However, as a tooth wears down, there is currently no method to measure wear without physically removing the tooth.

When the teeth wear down, they typically fall off The current method of detecting when a tooth falls off is an expensive machine vision system that looks at the bucket and detects when a tooth has gone missing. This system is extremely costly to implement, and only lets the operator know that the tooth has gone missing, not where it is. Once a crew notices a tooth is missing, they haul away an average ten truckloads of material in hopes of locating and separating out the fallen tooth. If they are unable to locate the tooth, the tooth can end up in a crusher. In addition the tooth can become stuck in the crusher and be ejected from the crusher, potentially harming other equipment.

SUMMARY

In one embodiment, the invention provides a method of monitoring a heavy machine tooth. The method includes coupling an RFID tag to the heavy machine tooth and positioning an RFID reader to read the RFID tag. The RFID reader provides an indication that the heavy machine tooth is separated from the heavy machine.

In other embodiments, the invention provides a heavy machine tooth monitoring system that includes a heavy machine tooth configured to be mounted on a bucket of a heavy machine, an active RFID tag coupled to the tooth, and an RFID reader configured to read data from the RFID tag.

In yet another embodiment, the invention provides a method of monitoring a heavy machine tooth. The method includes coupling an RFID tag to the heavy machine tooth, the RFID tag coupled to the heavy machine tooth to move with the heavy machine tooth and positioning an RFID reader to read the RFID tag. The method also includes receiving, by a controller, information from the RFID reader based on the data from the RFID tag, determining, by the controller, when the heavy machine tooth is separated from the heavy machine based on the information from the RFID reader, and determining, by the controller, diagnostic information for the heavy machine tooth based on the information from the RFID reader. In addition, the method includes providing, to a user, the diagnostic information and an indication to a user when the heavy machine tooth is separated from the heavy machine.

In still a further embodiment, the invention provides a heavy machine tooth monitoring system. The system includes a heavy machine tooth configured to be mounted on a bucket of a heavy machine, an active RFID tag coupled to the heavy machine tooth to move with the tooth, and an RFID reader configured to read data from the RFID tag, The RFID reader is further configured to provide an indication regarding the location of the tooth when the tooth separates from the bucket based on the data read from the RFID tag and provide diagnostic information regarding the heavy machine tooth based on the data read from the RFID tag.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Heavy machines are used to move large amounts of earth in industries such as mining and construction. Some heavy machines (e.g., an electric shovel) include buckets for scooping up the earth. The buckets often include a plurality of teeth to help break up the earth, and make it easier to scoop the earth into the bucket.

Figure 1:
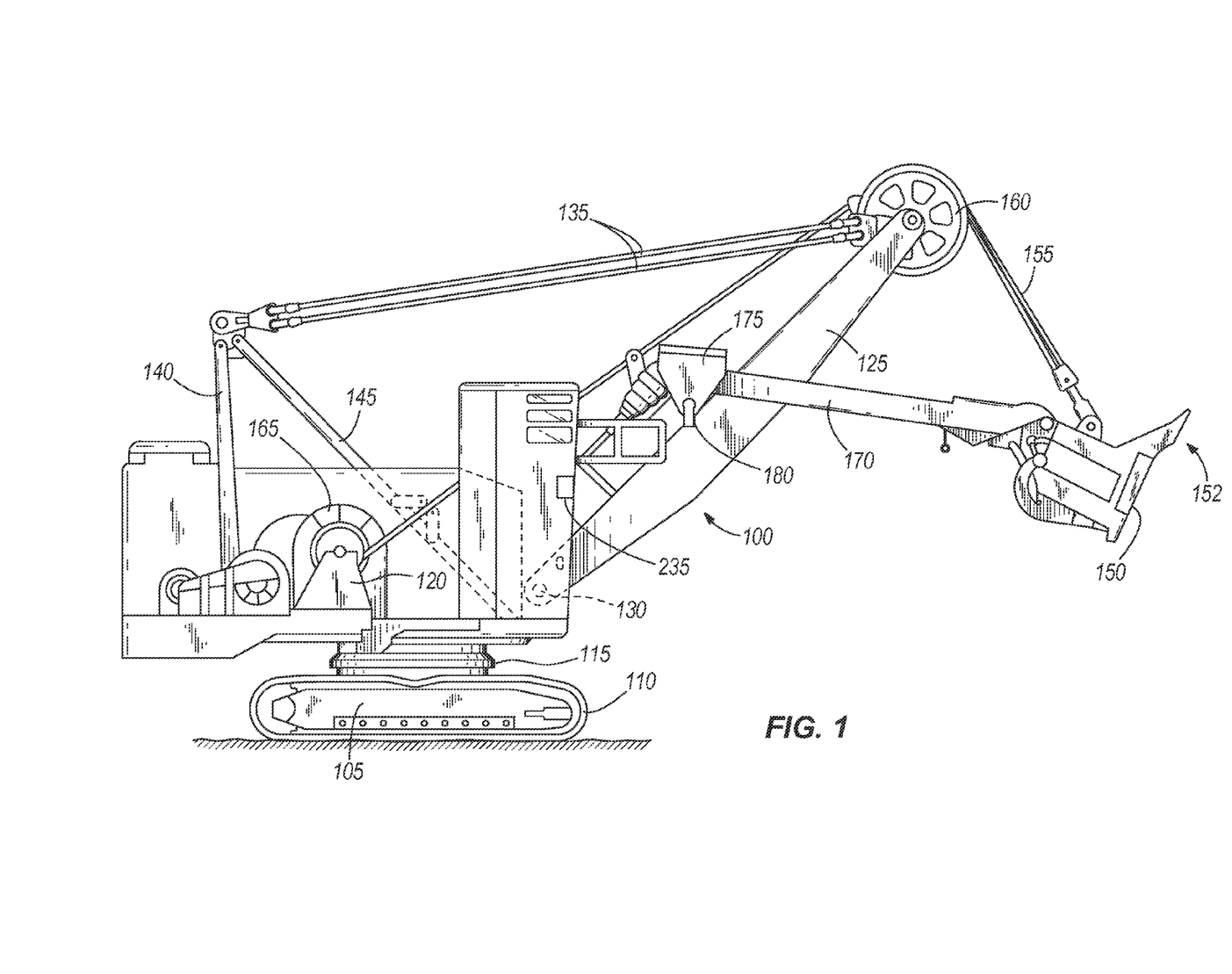
FIG. 1 is a side view of an exemplary shovel.

FIG. 1 shows an exemplary electric shovel 100 used for surface mining applications. The electric shovel 100 includes a mobile base 105 supported on drive tracks 110. The mobile base 105 supports a turntable 115, and a machinery deck 120. The turntable 115 permits full 360° rotation of the machinery deck 120 relative to the base 105.

A boom 125 is pivotally connected at 130 to the machinery deck 120. The boom 125 is held in an upwardly and outwardly extending relation to the deck by a brace or gantry in the form of tension cables 135 which are anchored to a back stay 140 of a stay structure 145 rigidly mounted on the machinery deck 120.

A dipper or bucket 150 includes a plurality of teeth 152, and is suspended by a flexible hoist rope or cable 155 from a pulley or sheave 160, the hoist rope is anchored to a winch drum 165 mounted on the machinery deck 120. As the winch drum rotates, the hoist rope 155 is either paid out or pulled in, lowering or raising the dipper 150. The boom pulley 160 directs the tension in the hoist rope 155 to pull straight upward on the shovel dipper 150. thereby producing efficient dig force with which to excavate the bank of material. The dipper 150 an arm or handle 170 rigidly attached thereto, with the dipper arm 170 slideably supported in a saddle block 175, which is pivotally mounted on the boom 125 at 180. The dipper arm 170 has a rack tooth formation thereon (not shown) which engages a drive pinion or shipper shaft (not shown) mounted in the saddle block 175. The drive pinion is driven by an electric motor and transmission unit 185 to effect extension or retraction of the dipper arm 170 relative to the saddle block 175.

The shovel boom 125 is a major structural component in size, shape, and weight. Its main purpose is to hold the boom pulley 160 in an advantageous position for efficient hoist dipper pull through the bank. Another major purpose of the boom 125 is to mount the shipper shaft at a sufficient height and outward radius from the centerline of rotation of the shovel 100. The shipper shaft powers the shovel handle to extend and retract the dipper 150. These two features of an electric shovel digging attachment make the shovel uniquely qualified to reach and dig high bank formations safely away from the shovel. The shovel in this regard is also able to reach a great volume of material in one sitting without propelling closer to the bank.

The bucket teeth 152 are removably attached to the bucket 150. This enables broken or worn teeth 152 to be easily replaced. However, this leads to teeth 152 occasionally breaking or falling off of the bucket 150. In some circumstances, a tooth 152 will break/fall off the bucket 150 and end up in the earth being mined (i.e., in the bucket 150). When the earth in the bucket 150 is deposited in a truck, the tooth 152 goes into the truck as well. Often the earth in the truck is taken to a crusher to be crushed. When the truck empties its contents into the crusher, the tooth 152 goes into the crusher as well, potentially damaging the crusher, being expelled from the crusher and damaging other equipment, or being damaged in the crusher.

Figure 2A:
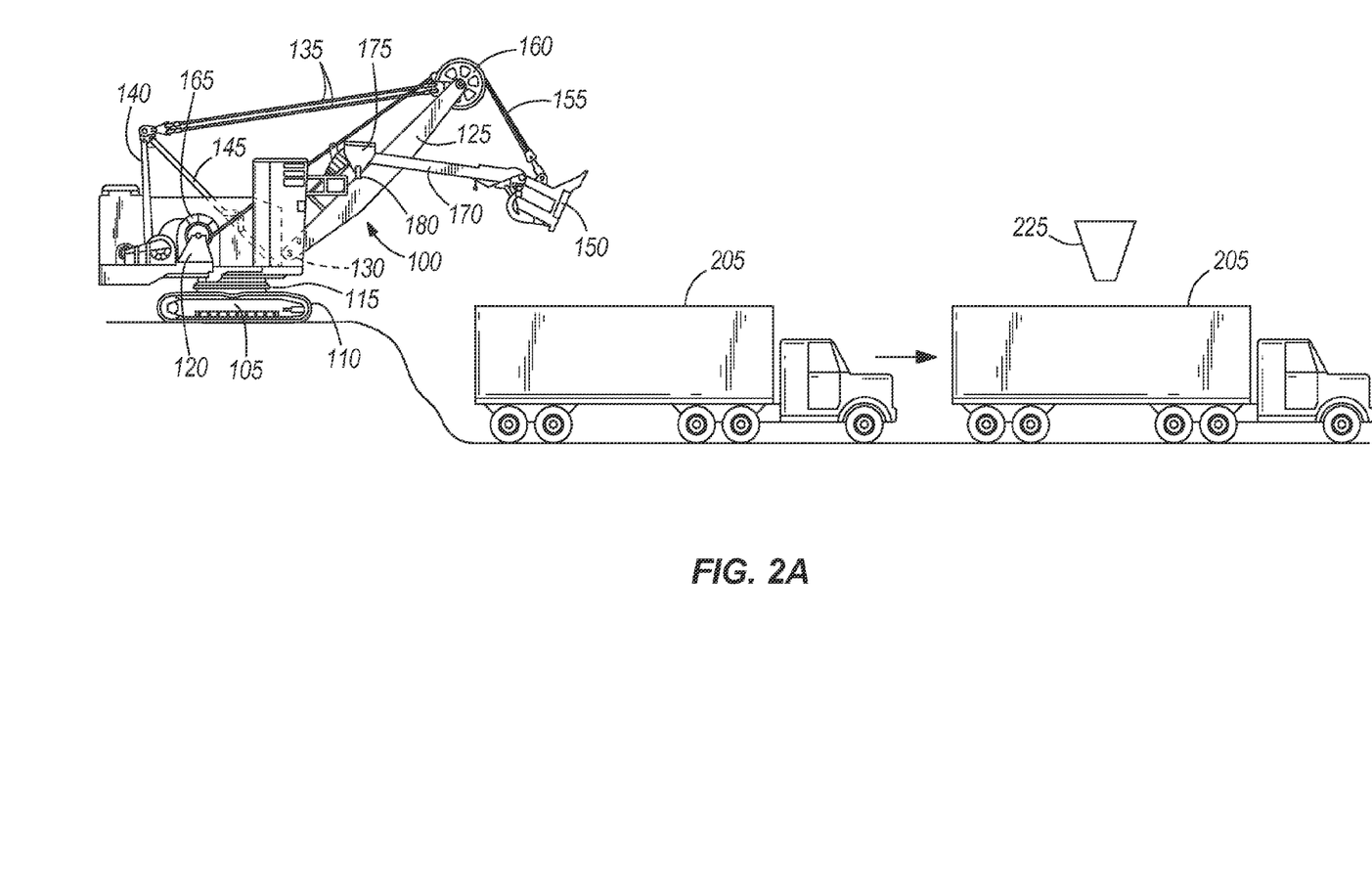
FIGS. 2A and 2B illustrate the operation of an exemplary mining site.
Figure 2B:
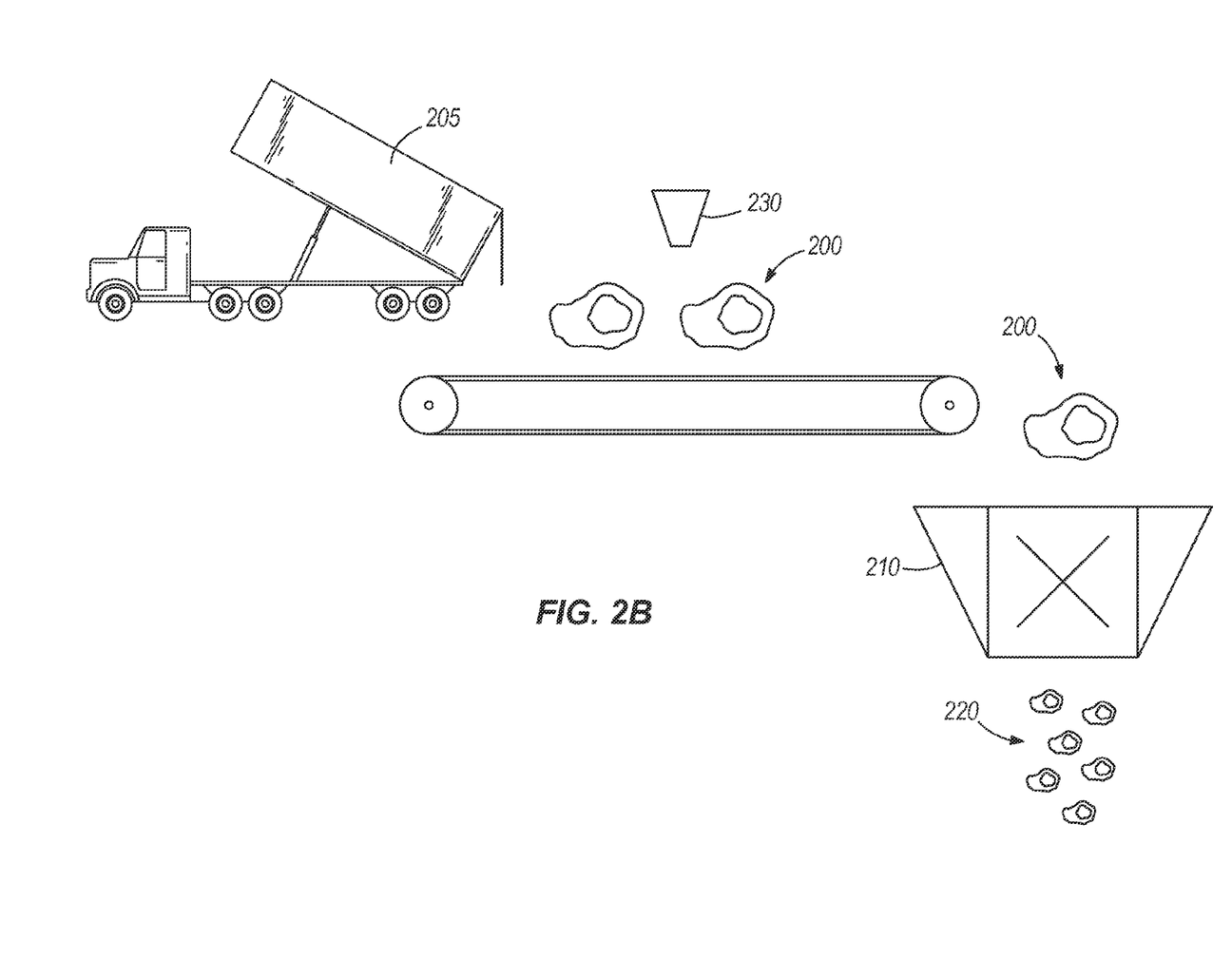

FIGS. 2A and 2B represent a typical mining operation. The shovel 100 digs up earth 200 with its bucket 150, and dumps the earth 200 into a truck 205. Once the truck 205 is full, the truck 205 takes the earth 200 to another location (e.g., at the mining site or remote from the mining site). In some operations, the truck 205 takes the earth 200 to a crusher 210. The truck 205 deposits the earth 200 onto a conveyor 215 which feeds the earth 200 into the crusher 210 which crushes the earth 200 into smaller components 220.

The invention uses an active RFID tag embedded in or attached to the metal tooth 152 of the heavy machine bucket to enable detection of a tooth 152 missing from the bucket 150.

The invention uses an RFID reader 225 located on a structure (e.g., an exit gate) through which the truck 205 passes after being filled. The RFID reader 225 checks if an RFID tag passed near the structure. If an RFID tag is detected, an alarm can be triggered enabling the truck 205 to be searched to determine if the detected RFID tag and corresponding tooth 152 was in the bed of the truck 205. If a tooth 152 containing an RFID tag had broken/fallen off the bucket 150 and was in the truck 205, it could be found before leaving the site or being deposited in the crusher 210. Preferably, the RFID reader 225 is positioned a far enough distance away from the bucket 150 that the reader 225 does not detect RFID tags in the teeth 152 that are still in place on the bucket 150.

In addition, an RFID reader 230 can be positioned before the entrance to the crusher 210 to detect the RFID tag on a tooth 152 prior to the tooth 152 entering the crusher 210 (e.g., the reader 230 could be positioned over the conveyor 215 feeding the crusher 210). Again, if the reader 230 detects an RFID tag, an alarm is triggered and the conveyor 215 and/or crusher 210 is/are stopped, enabling the tooth 152 to be located prior to entering the crusher 210.

An RFID tag in a tooth 152 can include information identifying the tooth 152. For example, the RFID tag can be written with data such as, but not limited to, a serial number, an origin, a date of manufacture, etc. This stored information can enable a user to quickly determine where the tooth 152 came from promoting faster repair of the bucket 150 or returning of the tooth 152.

In some embodiments, an RFID reader 235 is included in the heavy machine 100 itself (see FIG. 1). The reader 235 reads all of the RFID tags located on the machine 100, including the tags on the teeth 152. A controller or computer receives information from the reader 235 about the tags detected. The controller then provides diagnostic information to a user. This information can include when the tooth 152 was installed, how many hours the tooth 152 has been in operation, etc. In addition, should a tooth 152 break/fall off, the controller alerts the user of this condition enabling the lost tooth 152 to be found quickly and replaced.

In some embodiments, additional circuitry is included with the RFID tag to determine the amount of wear of a tooth, enabling preventative maintenance to be performed before a tooth fails.

In some embodiments, the RFID tag 300 is detuned when the tooth 152 is mounted to the bucket 150. When the tooth 152 breaks/falls off the bucket 150, the signal strength of the RFID tag 300 increases. The reader 235 detects the increase in signal strength and determines that the tooth 152 has broken/fallen off the bucket 150.

Figure 3:
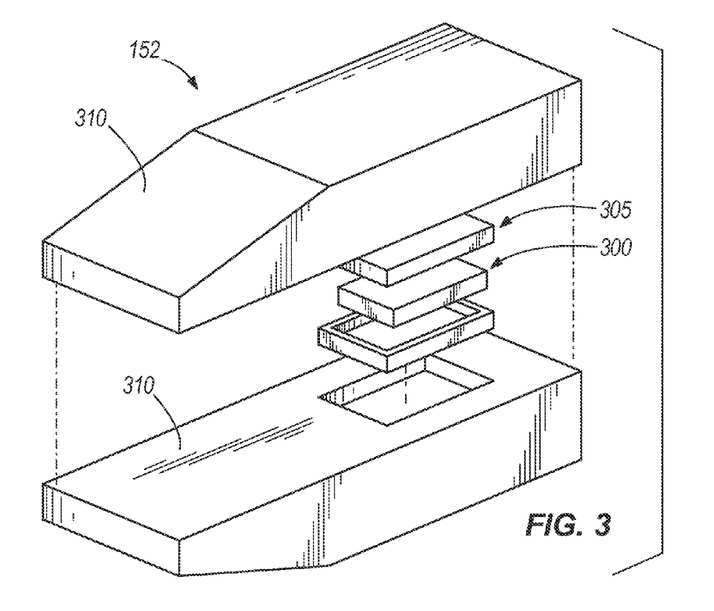
FIG. 3 is an exploded view of a construction of a bucket tooth incorporating an RFID tag.
Figure 4:
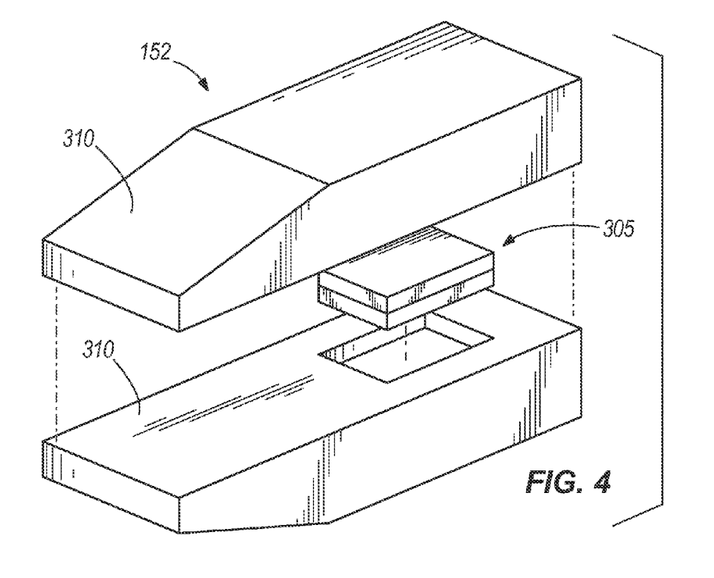
FIG. 4 is another view of the bucket tooth of FIG. 3.
Figure 5:
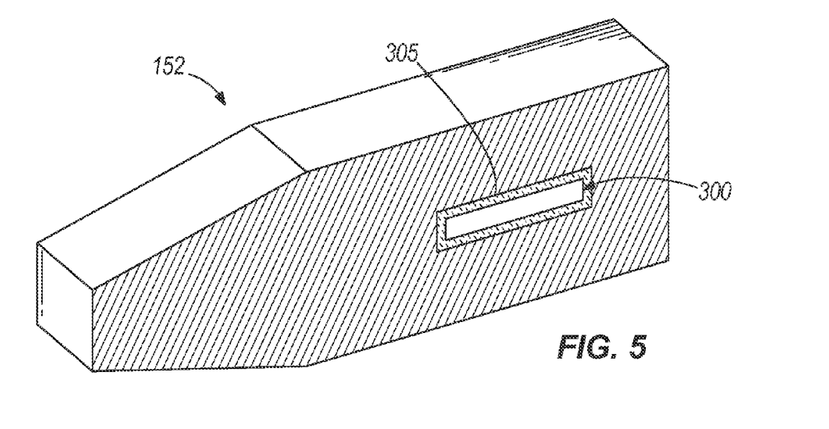
FIG. 5 is a cut-away view of the bucket tooth of FIG. 3.

FIGS. 3-5 show a view of a heavy machine bucket tooth 152. The tooth 152 includes an active RFID tag 300 encased in a ceramic enclosure 305, the ceramic enclosure 305 is then encased in steel 310. A separate control circuitry can also be included in the ceramic enclosure 305 to activate the RFID tag 300 when the tooth 152 is shipped or installed, saving battery power and extending the life of the RFID tag 300. The ceramic enclosure 305 with the RFID tag 300, and any other circuitry, is placed in a mold into which liquid steel is poured to form the tooth 152. The ceramic enclosure 305 protects the RFID tag 300 from the heat of the liquid steel. The RFID tag 300 is detuned such that the steel of the tooth 152 tunes the RFID tag 300 to the correct frequency, using the tooth 152 as an antenna. In some embodiments, a tuning circuit in the RFID tag 300 tunes the tag 300 once the tag 300 is activated in the tooth 152.

Figure 6:
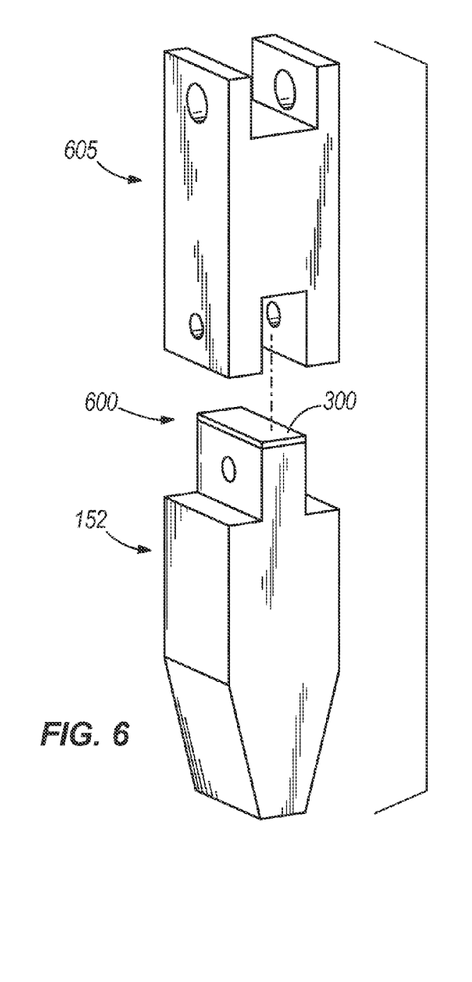
FIG. 6 is a plan view of another construction of a bucket tooth incorporating an RFID tag.

FIG. 6 shows another construction of a heavy machine bucket tooth 152 incorporating an RFID tag 300. The tag 300 is mounted to an end 600 of the tooth 152. The end 600 is inserted into a mounting bracket 605 and the tooth 152 is secured to the mounting bracket 605. In this construction, the RFID tag 300 takes advantage of the metal of the tooth 152 and the bracket 605, using backscattering to increase an intensity of the RFID signal.

Figure 7:
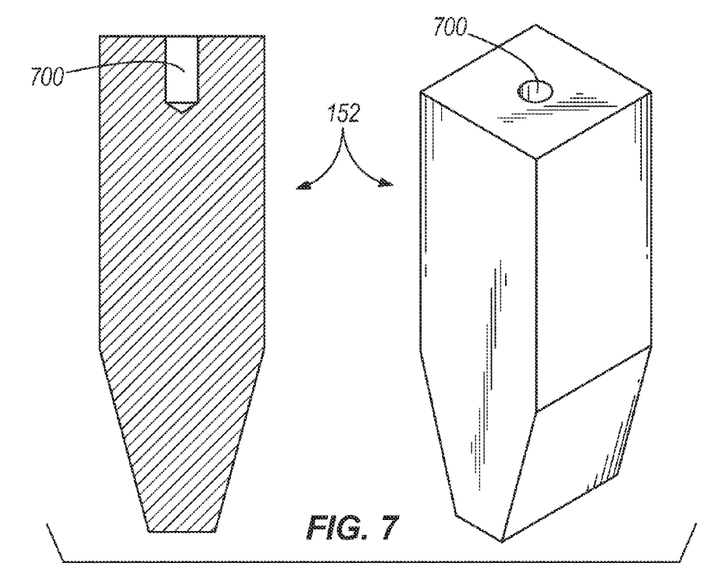
FIG. 7 is a plurality of views of a third construction of a bucket tooth incorporating an RFID tag.

FIG. 7 shows a construction of a heavy machine bucket tooth 152 arranged to receive an RFID tag. The tooth 152 includes a hole 700 drilled into the base of the tooth 152. A cylindrical RFID tag is inserted into the hole 700. In some constructions, a ceramic disk is placed over the RFID tag, and the hole 700 is welded shut.

Figure 8:
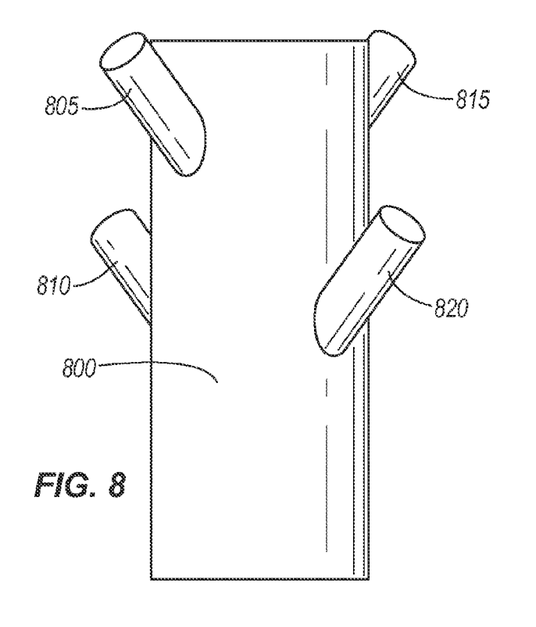
FIG. 8 is a plan view of a construction of a ceramic plug for inserting an RFID tag into the bucket tooth of FIG. 7.

FIG. 8 shows a construction of a ceramic plug 800 for insertion in the tooth 152 of FIG. 7. The ceramic plug 800 encapsulates an RFID tag and a tooth wear detection circuit. Four probes 805, 810, 815, 820 extend out of the ceramic plug 800. When the ceramic plug 800 is inserted into the hole 700 of the tooth 152, the probes 805-820 each contact the tooth 152 and are thereby electrically coupled to the tooth 152. The wear detection circuit uses the probes 805, 810, 815, 820 to electrically test the tooth 152 and determine the wear of the tooth 152. The wear detection circuit provides data to the RFID tag 300 regarding the wear of the tooth 152 (e.g., amount of loss, useful life remaining, etc.). The RFID tag 300 then communicates (e.g., via a wired or wireless connection) the wear information to an RFID reader (e.g., in a cab of a shovel, to a portable RFID reader, etc.).

Figure 9:
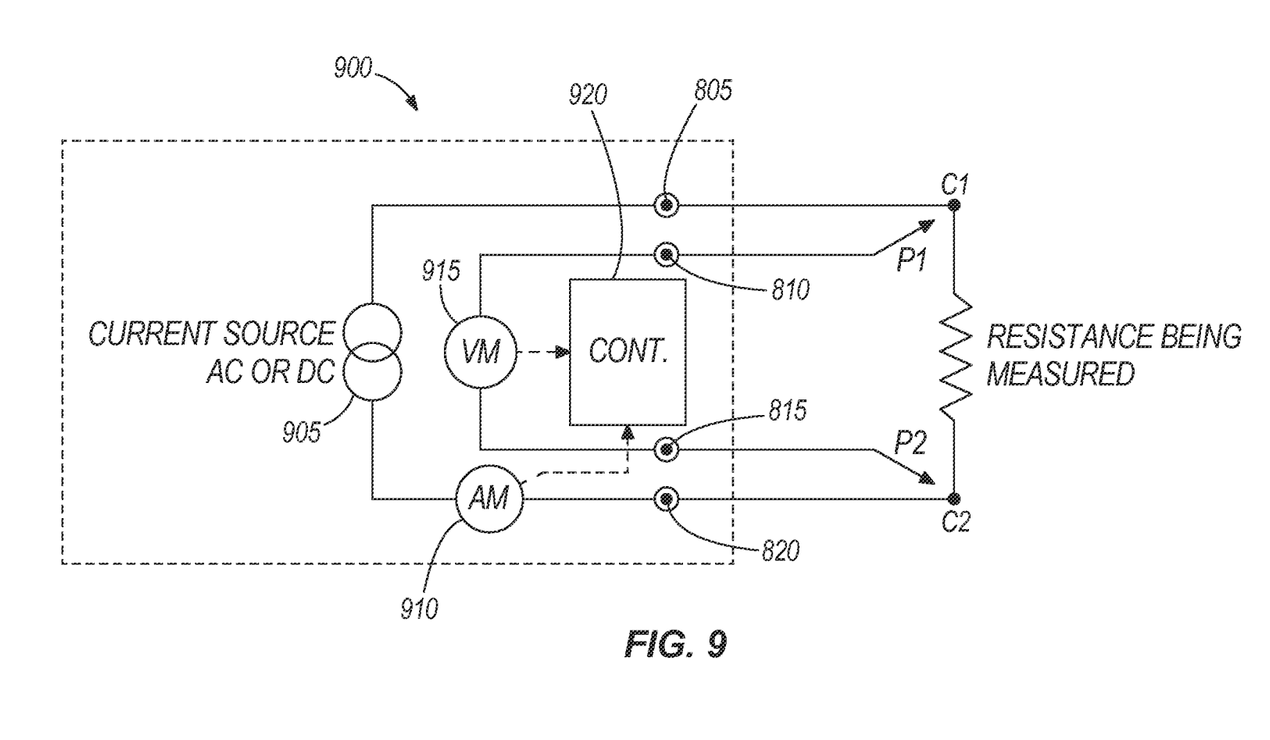
FIG. 9 is a schematic diagram of a wear detection circuit.

FIG. 9 shows a wear detection circuit 900 used to determine wear of the tooth 152. The circuit 900 uses a four-point resistance method to determine wear. A current source 905 produces a current that is applied to two of the probes 805 and 820. The current flowing through the probes 805 and 820 is detected by a current transducer 910. A voltage transducer 915 of the circuit 900 detects a voltage across the other two probes 810 and 815. Using the detected current and voltage, a microcontroller 920 of the circuit 900 determines a resistance of the tooth 152. The resistance varies based on the material composition of the tooth 152, the permittivity of the tooth 152, and the dimensions of the tooth 152. As the tooth 152 wears, the resistance of the tooth 152 changes. The change in resistance can thus be used to determine the wear and tear on the tooth 152. In some embodiments, the initial resistance (i.e., when the tooth 152 is new) is recorded in the RFID tag 300. Also, in some embodiments, other resistance measurements (e.g., the resistance previously determined) are recorded in the RFID tag 300.

Various features and advantages of the invention are set forth in the following claims.

What is claimed is:

1. A method of monitoring a heavy machine tooth, the method comprising:
    coupling an RFID tag to the heavy machine tooth, the RFID tag coupled to the heavy machine tooth to move with the heavy machine tooth and detuned when the heavy machine tooth is mounted to the heavy machine and tuned when the heavy machine tooth is separated from the heavy machine;
    positioning an RFID reader to read the RFID tag;
    receiving, by a controller, information from the RFID reader based on the data from the RFID tag;
    determining, by the controller, when the heavy machine tooth is separated from the heavy machine based on the information from the RFID reader;
    determining, by the controller, diagnostic information for the heavy machine tooth based on the information from the RFID reader; and
    providing, to a user, the diagnostic information and an indication to a user when the heavy machine tooth is separated from the heavy machine.

2. The method of claim 1, further comprising providing to the user an indication of a location of the heavy machine tooth when the heavy machine tooth is separated from the heavy machine.

3. The method of claim 1, wherein determining the diagnostic information includes determining a date the heavy machine tooth was installed on the heavy machine.

4. The method of claim 3, wherein determining the date the heavy machine tooth was installed on the heavy machine includes determining the date based on information read by the RFID reader from the RFID tag.

5. The method of claim 1, wherein determining the diagnostic information includes determining how many hours the heavy machine tooth has been in operation.

6. The method of claim 1, wherein coupling the RFID tag to the heavy machine tooth includes encasing the RFID tag in ceramic, placing the ceramic-encased RFID tag in a mold, and pouring liquid steel into the mold to form the heavy machine tooth.

7. The method of claim 1, further comprising magnifying a signal from the RFID tag by backscattering.

8. The method of claim 1, further comprising coupling a wear detection circuit to the RFID tag.

9. The method of claim 8, further comprising detecting wear of the heavy machine tooth using the wear detection circuit and transmitting from the wear detection circuit the detected wear, wherein the wear detection circuit detects resistance of the heavy machine tooth.

10. The method of claim 9, further comprising recording resistance detected by the wear detection circuit to the RFID tag.

11. The method of claim 9, further comprising recording an initial resistance of the heavy machine tooth prior to use of the heavy machine tooth to the RFID tag.

12. A heavy machine tooth monitoring system, the system comprising:
    a heavy machine tooth configured to be mounted on a bucket of a heavy machine;
    an active RFID tag coupled to an end of the heavy machine tooth to move with the tooth;
    a mounting bracket receiving the end of the heavy machine tooth and coupling the heavy machine tooth to the bucket;
    a tuning circuit included in the RFID tag, the tuning circuit tuning a frequency the RFID tag after the RFID tag is coupled to the tooth by using the tooth as an antenna; and
    an RFID reader configured to read data from the RFID tag and provide an indication regarding the location of the tooth when the tooth separates from the bucket based on the data read from the RFID tag and provide diagnostic information regarding the heavy machine tooth based on the data read from the RFID tag.

13. The system of claim 12, further comprising a wear detection circuit, wherein the wear detection circuit detects wear of the tooth and provides information on the detected wear of the heavy machine tooth to the RFID tag.

14. The system of claim 13, wherein the wear detection circuit uses a four-point resistance method to detect wear of the tooth.

15. The system of claim 13, wherein the RFID tag is embedded in a ceramic plug that is inserted in the heavy machine tooth, and wherein four probes in electrical communication with the wear detection circuit are embedded in and extend from the plug and are in electrical contact with the heavy machine tooth.

16. The system of claim 12, wherein the RFID tag stores information, the information includes at least one selected from the group of a serial number, an origin, and a date of manufacturer.

17. The system of claim 12, further comprising a battery included in the RFID tag and control circuitry configured to activate the battery when the RFID tag is coupled to the heavy machine tooth.

* * * * *